(12) United States Patent
Sargsyan

(10) Patent No.: US 11,238,541 B1
(45) Date of Patent: Feb. 1, 2022

(54) TAX COMMUNICATION SYSTEM AND METHOD OF USE

(71) Applicant: Arman Sargsyan, Glendale, CA (US)

(72) Inventor: Arman Sargsyan, Glendale, CA (US)

( * ) Notice: Subject to any disclaimer, the term of this patent is extended or adjusted under 35 U.S.C. 154(b) by 287 days.

(21) Appl. No.: 16/507,540

(22) Filed: Jul. 10, 2019

Related U.S. Application Data

(60) Provisional application No. 62/695,984, filed on Jul. 10, 2018.

(51) Int. Cl.
*G06Q 40/00* (2012.01)
*G06F 16/27* (2019.01)

(52) U.S. Cl.
CPC ........... *G06Q 40/123* (2013.12); *G06F 16/27* (2019.01)

(58) Field of Classification Search
CPC ............................ G06Q 40/123; G06F 16/27

USPC .......................................................... 705/31
See application file for complete search history.

(56) References Cited

U.S. PATENT DOCUMENTS

| 2003/0078798 | A1* | 4/2003 | Zaks ................ G06Q 10/06375 705/7.37 |
| 2012/0022932 | A1* | 1/2012 | Ossenmacher .... G06Q 30/0222 705/14.23 |

* cited by examiner

*Primary Examiner* — Garcia Ade
(74) *Attorney, Agent, or Firm* — Leavitt Eldredge Law Firm

(57) ABSTRACT

A tax communication system facilitates the interaction between a person and professional. The professional is located in a database access by a portal. The person uploads documents pertinent to the service provided by the professional and grants the access to view the documents. The professional performs their service and generates forms to document the service. The forms are shared to the person via the portal.

9 Claims, 4 Drawing Sheets

TAX COMMUNICATION SYSTEM AND METHOD OF USE

BACKGROUND

1. Field of the Invention

The present invention relates generally to tax preparation systems, and more specifically, to a method and means of selecting a qualified professional to perform a service such as tax preparation.

2. Description of Related Art

Tax preparation systems are well known in the art and are effective means to hire a tax professional. For example, FIG. 1 depicts a flowchart 101 of a conventional tax preparation system. As shown, a user may research tax professionals and call for pricing, as shown with boxes 103, 105. The user will eventually select a professional, wherein the user will take their documents to the professional for completion of a tax return, as shown with boxes 107, 109.

One of the problems commonly associated with method 101 is efficiency. For example, the user may find it inconvenient and time consuming to take their documents to the preparer. Further, the user is provided with limited information for selecting a professional.

Accordingly, although great strides have been made in the area of tax preparation systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
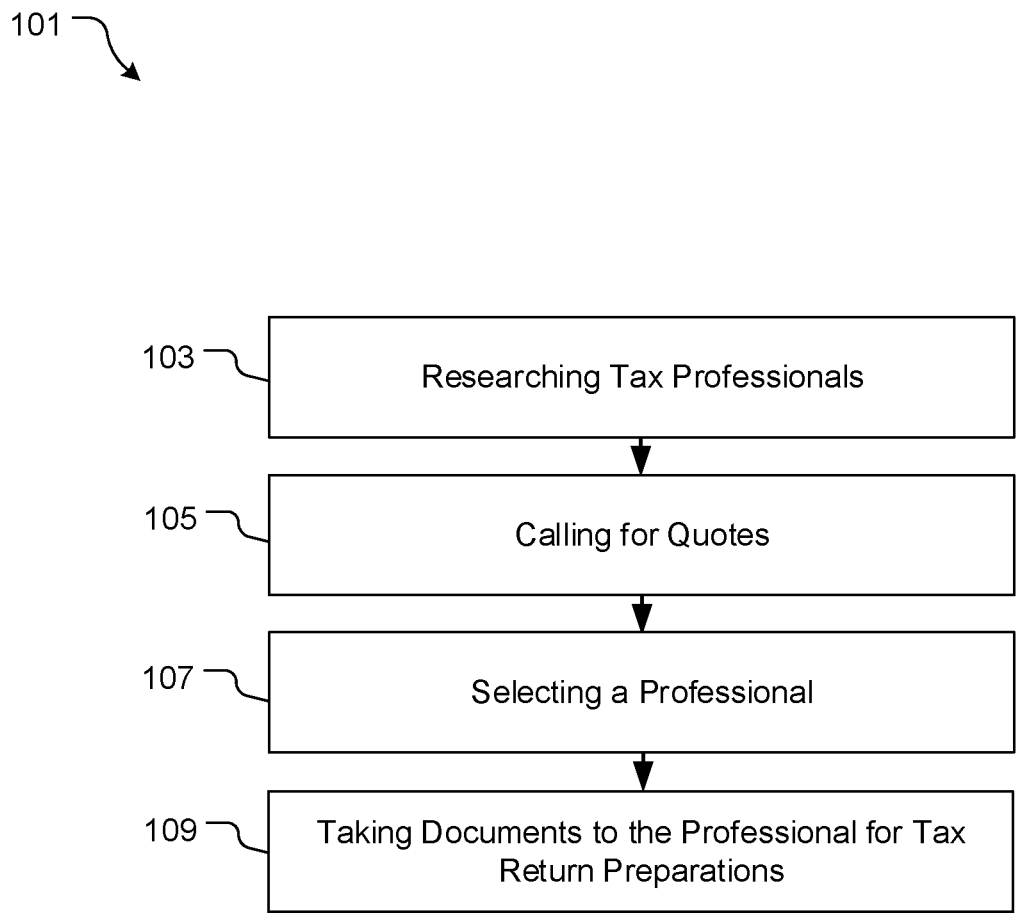
FIG. 1 is a flowchart of a conventional tax preparation system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
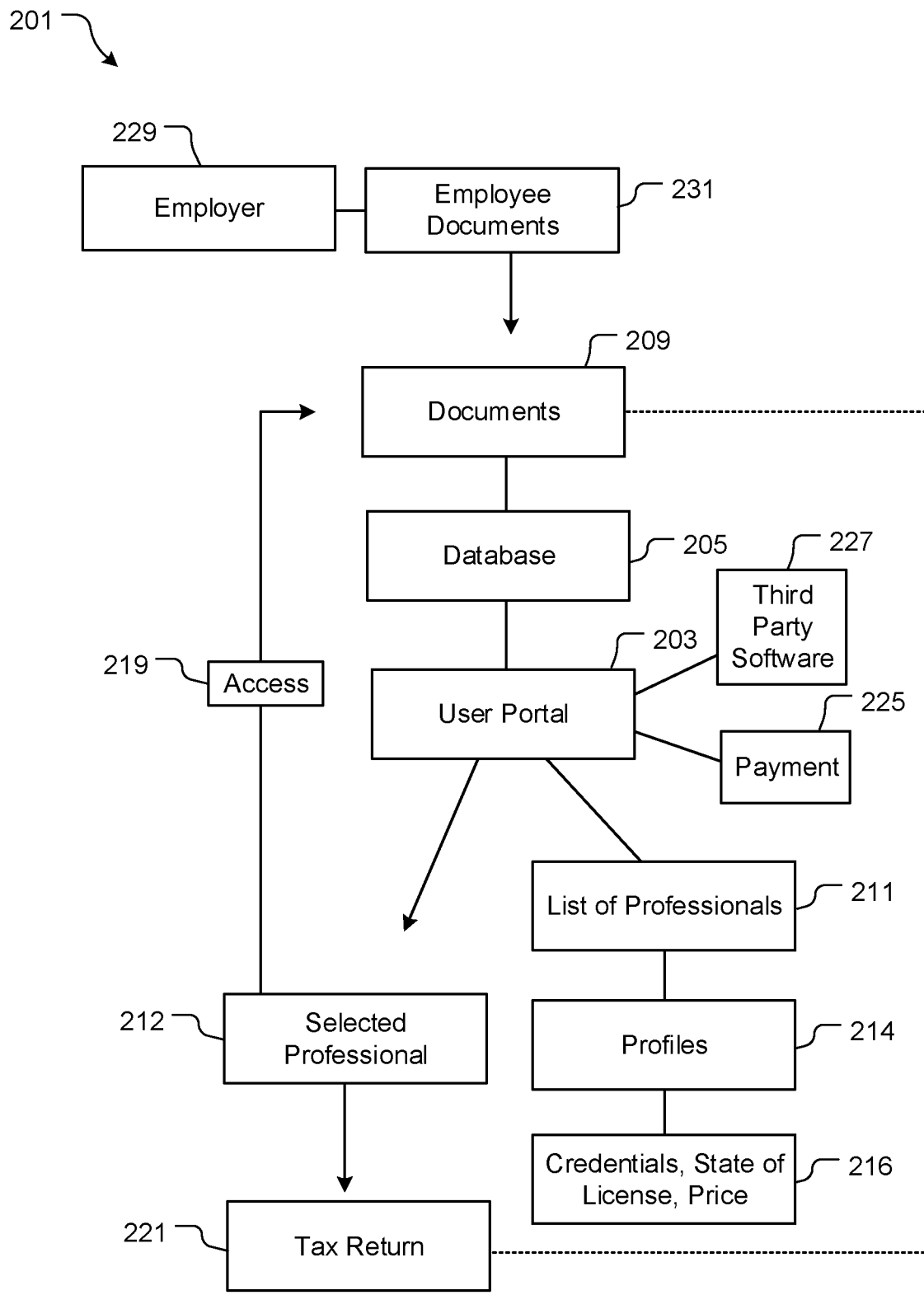
FIG. 2 is a diagram of a tax communication system in accordance with a preferred embodiment of the present application system.

Referring now to the drawings wherein like reference characters identify corresponding or similar elements throughout the several views, FIG. 2 depicts a diagram of a tax communication system in accordance with a preferred embodiment of the present application.

In the contemplated embodiment, system 201 includes a portal 203 in electronic communication with a database 205 where the portal 203 allows a user to save documents 209 in the database 205. It should be appreciated that the documents in the preferred embodiment include tax documents. In the preferred embodiment, the portal 203 also provides a list of professionals 211 from which the user may browse and select a selected professional 212. In the preferred embodiment, the list of professionals 211 includes profiles 214, wherein the profiles provide for information regarding an associated professional. Some of the information 216 contemplated is a list of credentials, a state of license, and a price for service. Some contemplated credentials include a CPA credential, an enrolled agent credential, and a registered tax preparer credential.

As further shown, the system is configured with an access portal 219, wherein the selected professional 212 is granted access to the documents 209, thereby providing the selected professional with the information necessary to generate a tax return 221. It is contemplated that the tax return can be sent electronically to the database or provided to the user in physical form. The system can further be connected to one or more third party software 227, wherein the user can proceed to file their own tax return. The system further includes a payment portal 225, wherein the user can provide payment to the selected preparer. In some embodiments, payments will be made by credit cards or other an electronic payments network from taxpayer to an administrator of the system and then after work is done and taxpayer approves the filing of his/her tax return, payment will be transfer to a tax preparer. The administrator may collect a fee.

In some embodiments, it is contemplated that the system can be connected to an employer portal 229, wherein an employer can provide employee documents 231 directly to the user, thereby improving the efficiency of the system.

Figure 3:
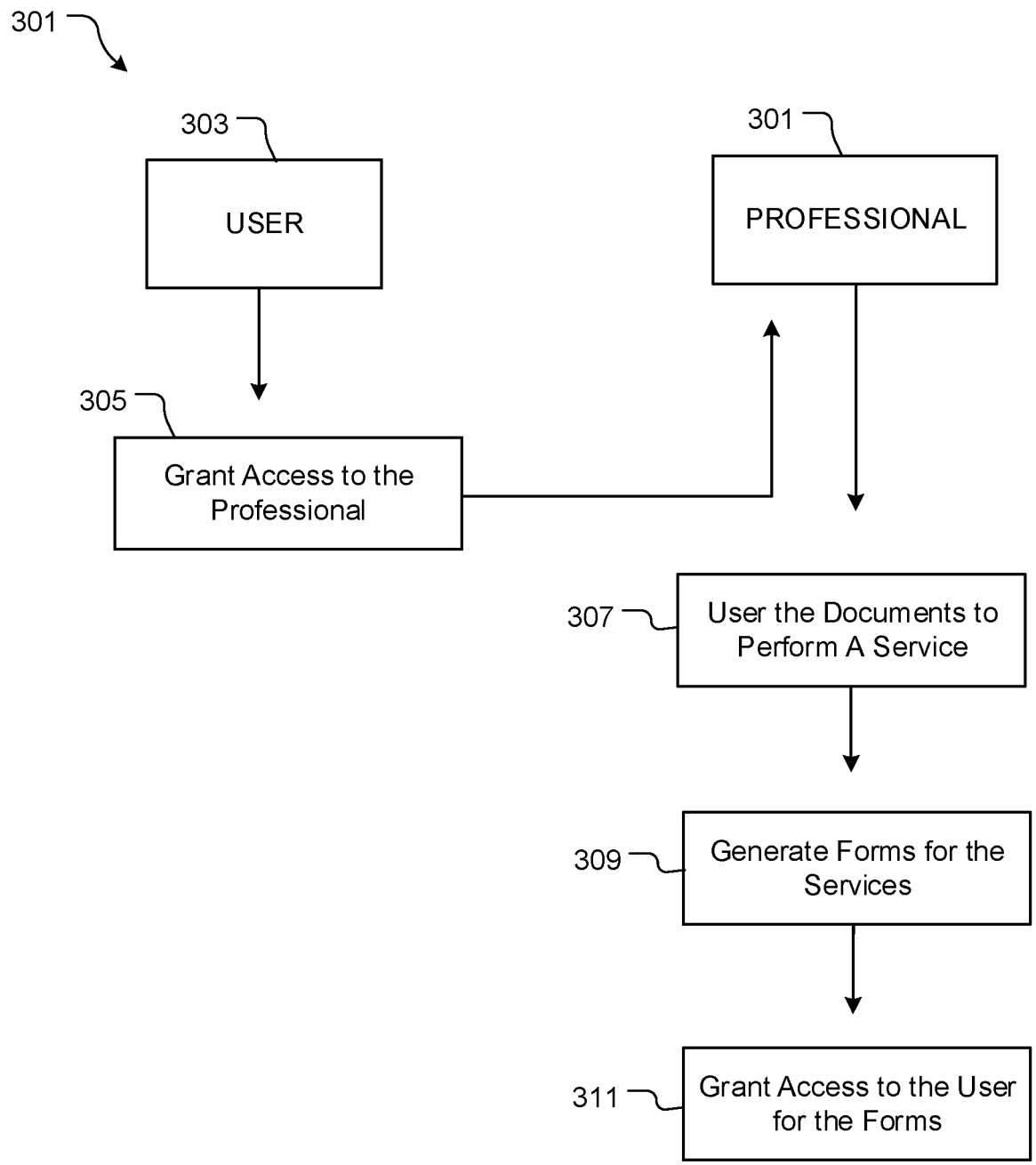
FIG. 3 is a diagram of the process of the system of FIG. 1.

As shown in FIG. 3, Once a professional 301 has been selected by the user 303, the user grants access 305 to the professional 301 as depicted by the process 301. The professional 301 uses the documents to perform a service 307. The professional 301 generates forms 309 and saves them to the database via the portal. The user is given access to the forms 311.

It should be appreciated that one of the unique features believed characteristic of the present application is that the portal allows a user and professional to communicate in an efficient manner to accomplish some task such as tax preparation.

Figure 4:
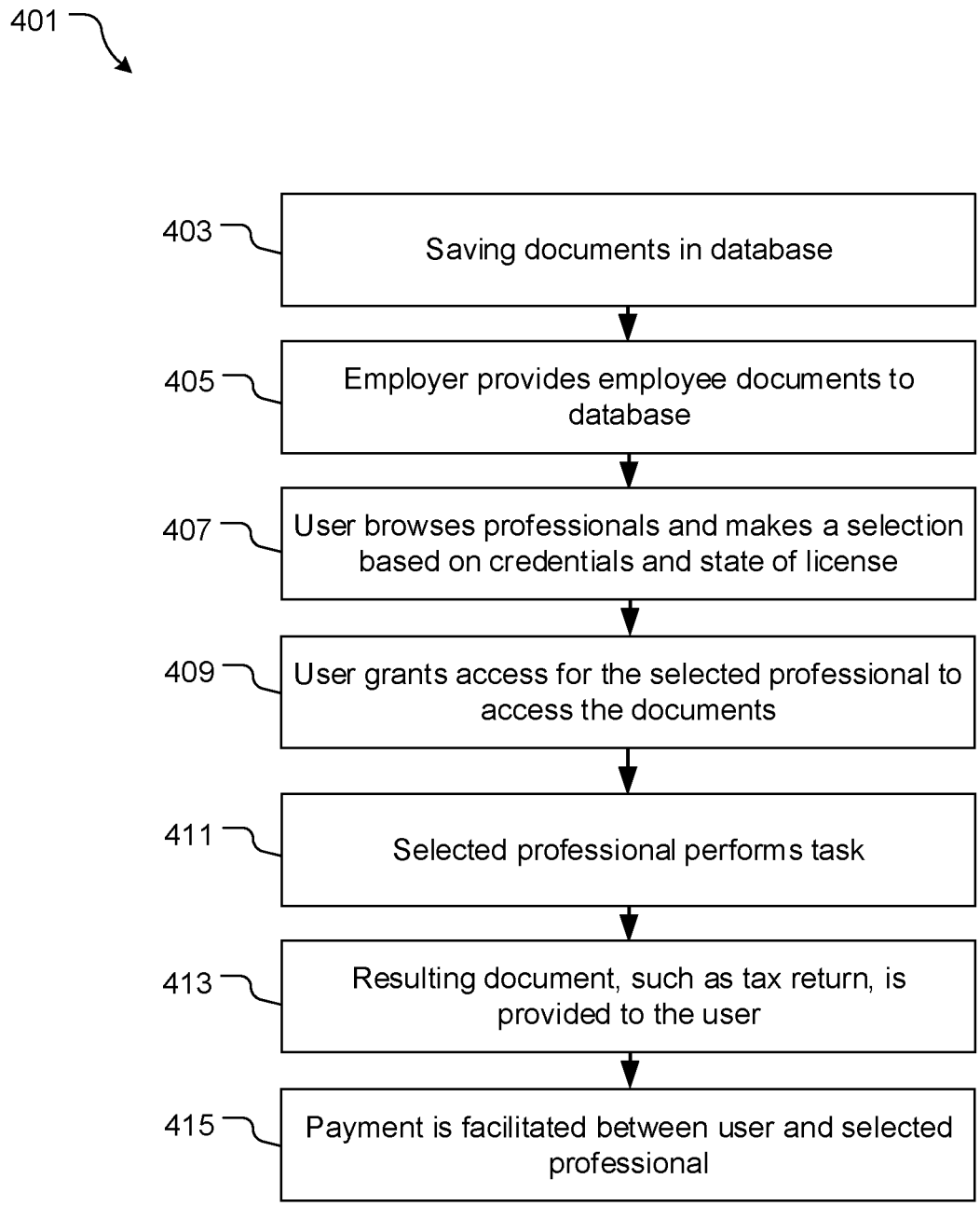
FIG. 4 is a flowchart of the preferred method of use of the system of FIG. 1.

Referring now to FIG. 4 the preferred method of use of system 201 is depicted. Method 401 including the user saving documents to the database and in some embodiments, the employer providing employee documents to the database, as shown with boxes 403, 405. The user can browse professional profiles and select a professional, wherein the professional is granted access to the documents, as shown with boxes 407, 409. The professional can proceed with completing their task, resulting in a document to be provided to the user, as shown with boxes 411, 413. Payment can then be facilitated, as shown with box 415.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A tax communication system, comprising:
   a portal accessible via a computing device, the computing device in data communication with a database, the computing device having a display;
   the database having a plurality of documents stored thereon;
   a list of professionals accessible via the portal, the list of professionals including a plurality of profiles, each of the plurality of profiles having a state of license and one or more credentials, the plurality of profiles are stored on the database and shown to a user via the display;
   an access portal configured to be manipulated by the user to grant a selected professional access to the plurality of documents, the access portal allows the user to toggle between the plurality of profiles;
   an employer portal in communication with the database; and
   one or more employee documents generated by the employer and transmitted to the database;
   wherein the selected professional can access the plurality of documents for tax purposes.

2. The system of claim 1, wherein the one or more credentials comprises a CPA credential, an enrolled agent credential, and a registered tax preparer credential.

3. The system of claim 1, wherein each of the plurality of profiles further includes a price for a service.

4. The system of claim 1, further comprising:
   a payment portal configured to facilitate payment from the user to the selected professional.

5. The system of claim 1, further comprising:
   a tax return document generated by the professional through access to the documents of the database.

6. The system of claim 5, wherein the tax return document is stored within the database.

7. A method of hiring a professional to prepare a tax return, the method comprising: providing the system of claim 1;
   saving the plurality of documents to the database;
   using the platform and a computing device to access the list of a plurality of professionals;
   browsing the plurality of profiles associated with the list of the plurality of professionals;
   selecting the selected professional from the list of the plurality of professionals;
   granting access to the plurality of documents to the selected professional; and
   receiving a tax return from the selected professional through the portal.

8. The method of claim 7, further comprising:
   paying the tax professional through a payment portal.

9. The method of claim 7, further comprising:
   receiving employee documents from an employer, wherein the employer uploads the employee documents into the database.

* * * * *